Patented Apr. 9, 1935

1,997,534

UNITED STATES PATENT OFFICE 1,997,534

MANUFACTURE OF PISTON RINGS AND THE LIKE

William Arthur Oubridge, Coventry, England

Application March 5, 1934, Serial No. 714,187
In Great Britain December 16, 1933

8 Claims. (Cl. 29—156.62)

This invention relates to the manufacture of piston and like rings from a cylinder or "pot" and has for its object to provide new or improved methods of producing rings to the selected curve, hereinafter defined, in which, during the process of heat-forming or of hardening, the rings are prevented from becoming distorted out of their own plane.

It is known that if a circular ring split transversely at one point, is expanded at the split in a circumferential direction and heated so as to set the ring in its expanded state it will exert a uniform outward pressure when compressed within a cylinder. The shape of such a ring when in its free and unstressed state is that of an involute of a cycloid and is referred to throughout this specification as the selected curve.

In the manufacture of piston rings as at present carried out the process of heat-forming or hardening has been effected after the rings have been severed from the pot, the loose rings, arranged in stack formation, being clamped between a pair of plates to keep them in plane alignment.

The improved method of manufacture of piston and the like rings to the selected curve according to this invention dispenses with the need for clamping plates and is characterized in that the heat-forming or hardening process is carried out after the rings are formed in the pot but before they are parted therefrom. By this means the rings are effectually prevented from becoming distorted out of their own plane.

In the accompanying drawing.

Figure 2:
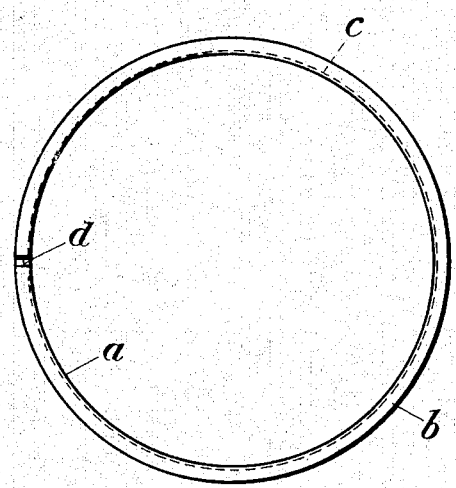
Figure 2 is an end view of the same.
Figure 4:
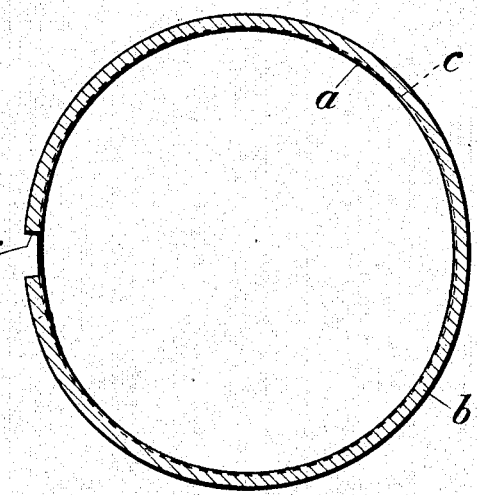
Figure 4 is a cross-sectional view of a pot illustrating an alternative method of producing rings to the selected curve.

The cross-sectional form of the pot $a$ after being turned to the required diameter may either be circular, as shown in Figure 2, or in the form of the selected curve as represented in Figure 4.

Figure 1:
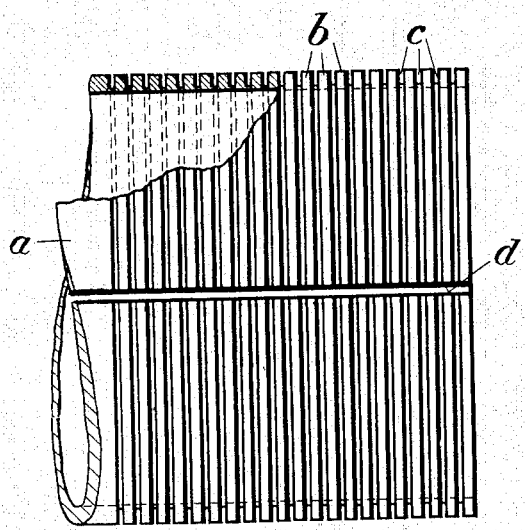
Figure 1 shows a portion of a pot in which the rings are formed.

In either case the rings $b$ are formed in the pot by making a series of annular saw cuts $c$, which are preferably substantially narrower than the rings themselves, the sawing operation being stopped short of actually severing the rings from the pot, as seen in Figure 1.

Figure 3:
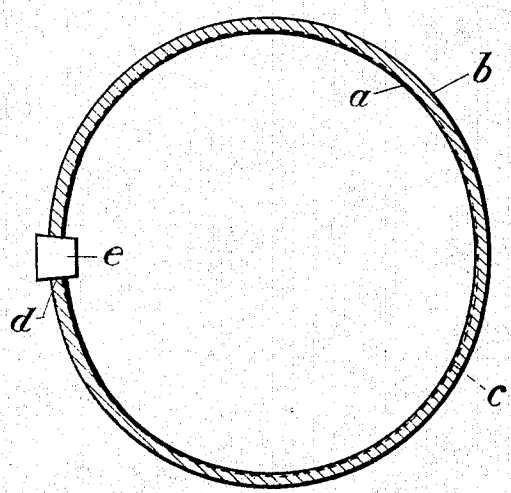
Figure 3 shows the pot expanded to the form of the selected curve.

Where, as represented in Figures 1 and 2, the pot is of circular cross-section it is slotted through longitudinally at $d$ across the annular saw-cuts to form the gap and subsequently expanded or distended by the insertion in the gap of a spacing strip $e$, as shown in Figure 3 so as to cause the pot to assume in cross-section the shape of the selected curve aforesaid. The pot is then exposed to the action of heat to set it in its expanded form after which the spacing strip $e$ is removed when the formed rings can be readily separated by breaking them apart or by machining out the bore of the pot so that the rings fall apart.

Figure 5:
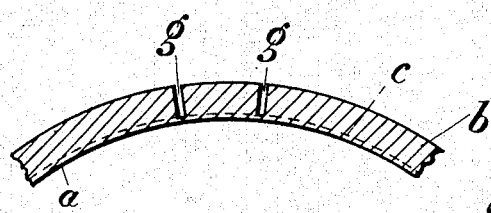
Figure 5 is a detail view showing an alternative method of forming the gap.

In the alternative case where the pot is turned or heat formed in the first instance to the shape of the selected curve, it is saw-cut annularly as above described to form the rings and either cut with a longitudinal groove $f$, Figure 4, equal to width to the open gap of an unstressed piston ring, or with two longitudinal saw-cuts $g$, $g$, Figure 5, at a distance from each other equal to the width of the said open gap, the depth of the groove or the cuts being slightly less than the full radial thickness of the pot, so that after the pot has been heat treated the metal at the bottom of the groove, heat treated the longitudinal cuts, can be knocked out and the rings separated from each other. The longitudinal cuts can be made by a saw, a cutting flame or by any other suitable means.

I claim:—

1. The method of manufacture of piston rings from a cylindrical pot which consists in making a series of annular saw cuts in the pot, slotting the pot through longitudinally across the saw cuts, expanding the pot by the insertion of a spacing strip in the slot, heating the pot to set it in its expanded form, removing the spacing strip, and separating the individual rings formed by the annular saw cuts.

2. The method of manufacture of piston rings from a pot which consists in forming the pot to the selected curve, making a series of annular saw cuts in the pot, cutting a longitudinal groove in the pot equal in width to the open gap of an unstressed piston ring, and of a depth slightly less than the thickness of the wall of the pot, heating the pot for hardening purposes, removing the bottom of the groove and separating the individual rings formed by the annular saw cuts.

3. The method of manufacture of piston rings from a pot which consists in forming the pot to the selected curve, making a series of annular saw cuts in the pot, cutting two longitudinal grooves in the pot at a distance from each other equal to the width of the open gap of an unstressed piston ring and of a depth slightly less than the thickness of the wall of the pot, heating the pot for hardening purposes, removing the strip of metal between the longitudinal grooves and separating the individual rings formed by the annular saw cuts.

4. The method of manufacture of piston rings from a pot, comprising partially removing the material of the pot between adjacent ring portions in a radial direction to form an annular groove of substantially uniform depth in a radial direction and to leave a thin web connecting said adjacent ring portions, and giving said ring portions thus partially severed from the pot the selected curve before the rings are completely severed from the pot.

5. The method of manufacture of piston rings from a pot, comprising partially removing the material of the pot between adjacent ring portions in a radial direction to form an annular groove between adjacent ring portions of substantially uniform depth in a radial direction and to leave a thin web connecting said ring portions, giving said ring portions thus partially severed from said pot the selected curve, and subsequently heat-treating the pot before the ring portions are completely severed therefrom.

6. The method of manufacture of piston rings from a pot, comprising partially removing the material of the pot between adjacent ring portions in a radial direction to leave a thin web connecting said ring portions, thereafter expanding said pot with said ring portions thus partially severed therefrom to the shape of the selected curve, and subsequently heat-treating the pot before the ring portions are severed therefrom.

7. The method of manufacture of piston rings from a pot, comprising partially removing the material between adjacent ring portions of a pot having the selected curve, and subsequently heat-treating the pot before the rings are completely severed from the pot.

8. The method of manufacture of piston rings from a pot, comprising giving said pot prior to setting heat-treatment the selected curve, partially removing in a radial direction the material of the pot between adjacent ring portions thereof prior to setting heat-treatment, and subsequent to both of the foregoing steps heat-treating the pot before the ring portions are completely severed therefrom to set such ring portions in such selected curve.

WILLIAM ARTHUR OUBRIDGE.